June 20, 1939.　　O. VON ASBOTH　　2,162,794
ROTARY WING AIRCRAFT
Filed Sept. 30, 1936　　4 Sheets-Sheet 1
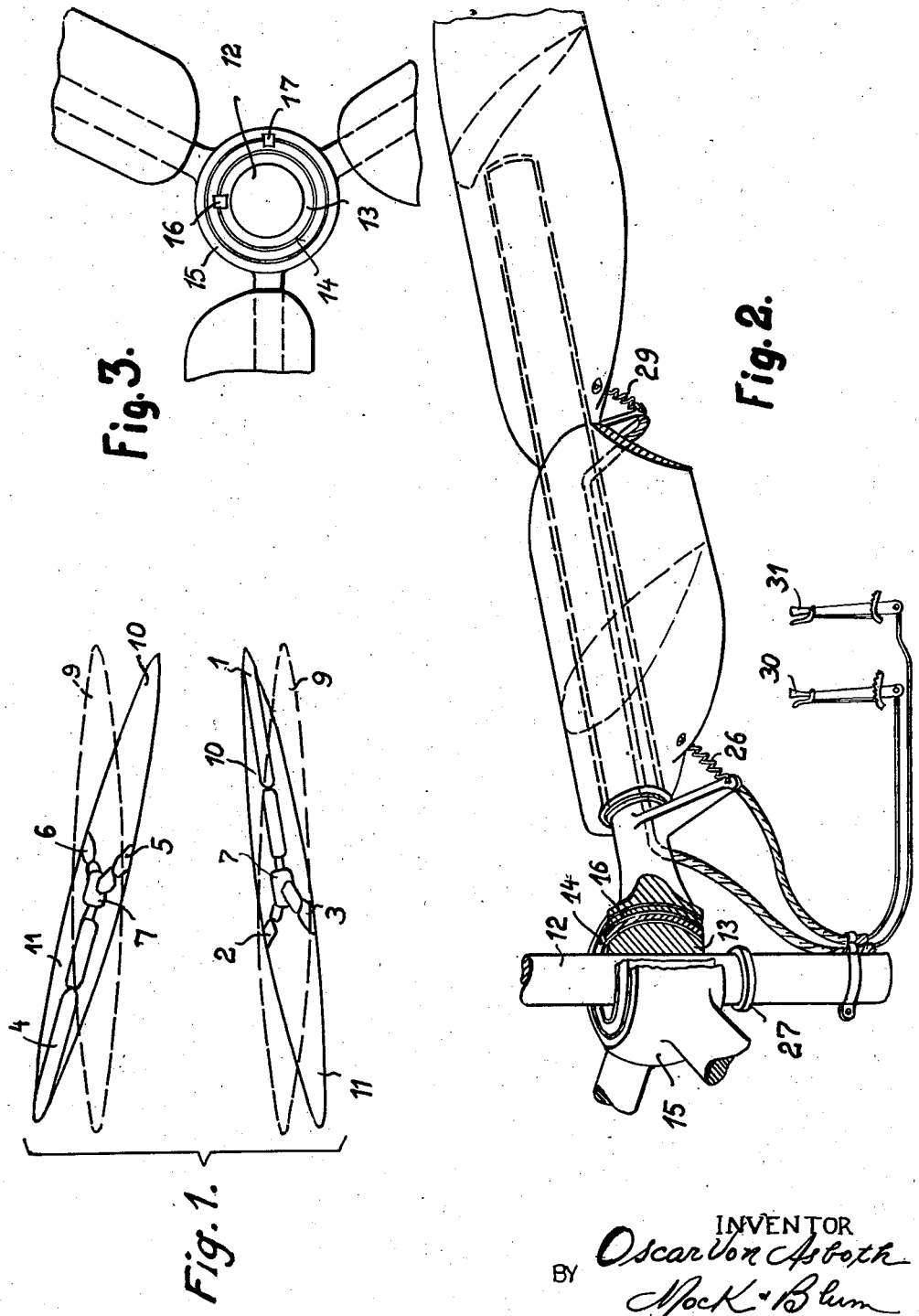
INVENTOR
Oscar Von Asboth
BY Mock + Blum
ATTORNEYS June 20, 1939.  O. VON ASBOTH  2,162,794
ROTARY WING AIRCRAFT
Filed Sept. 30, 1936  4 Sheets-Sheet 2

INVENTOR
Oscar Von Asboth
BY Nock-Blum
ATTORNEYS

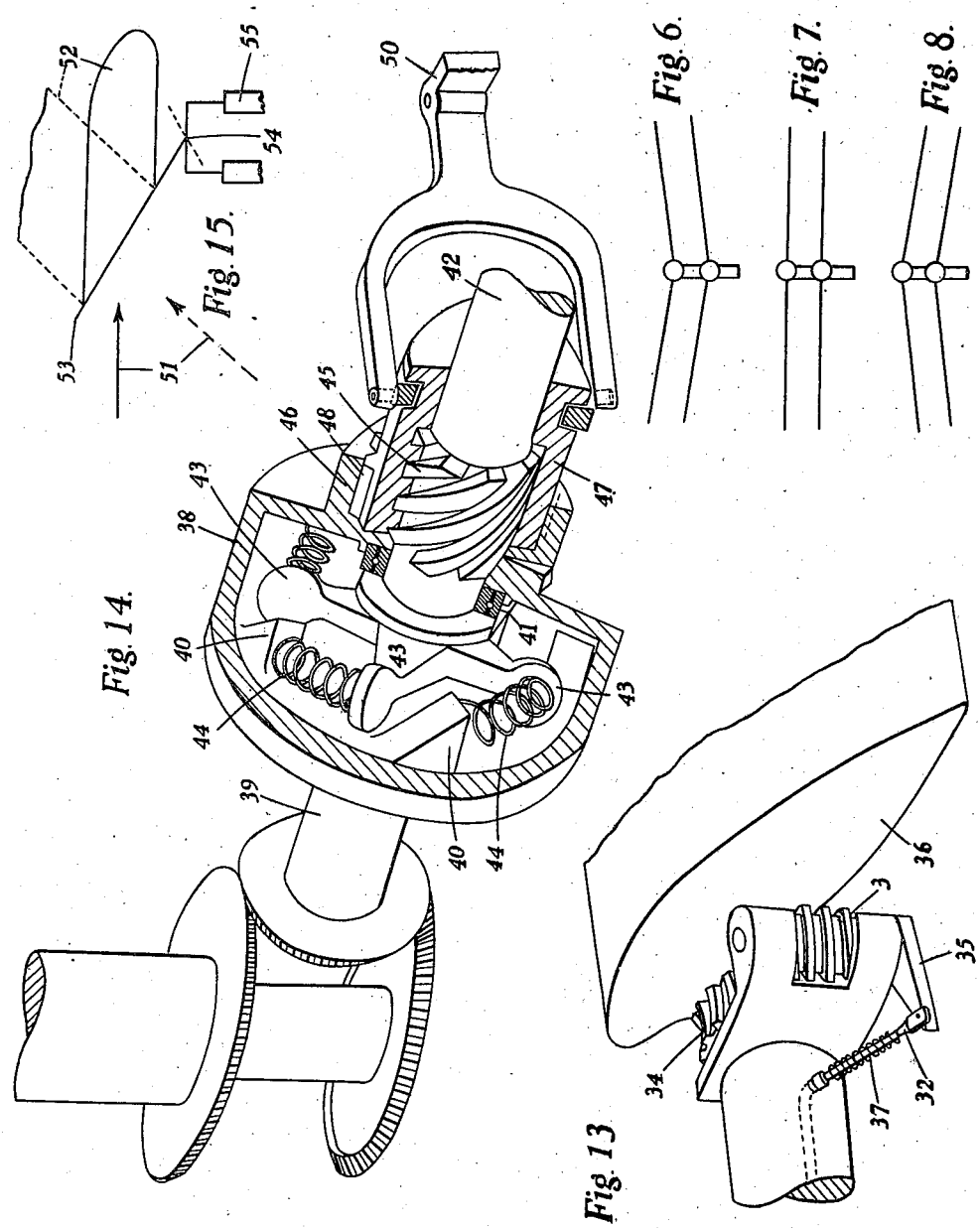

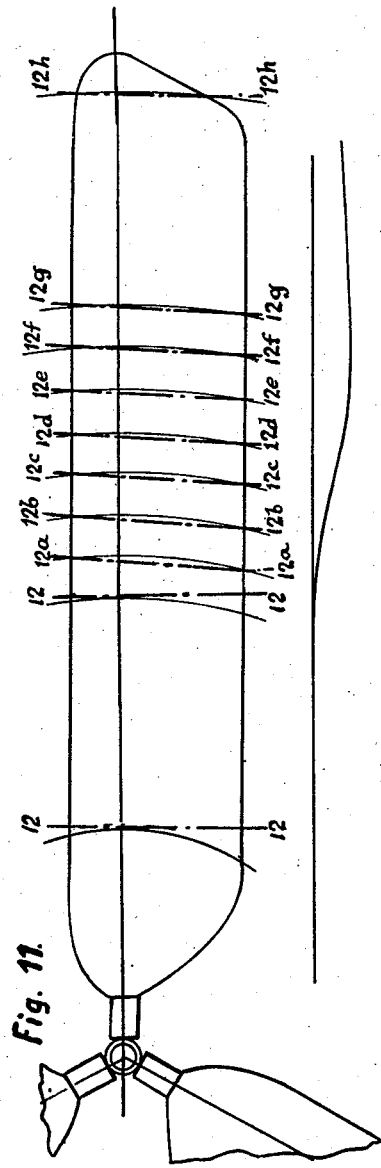
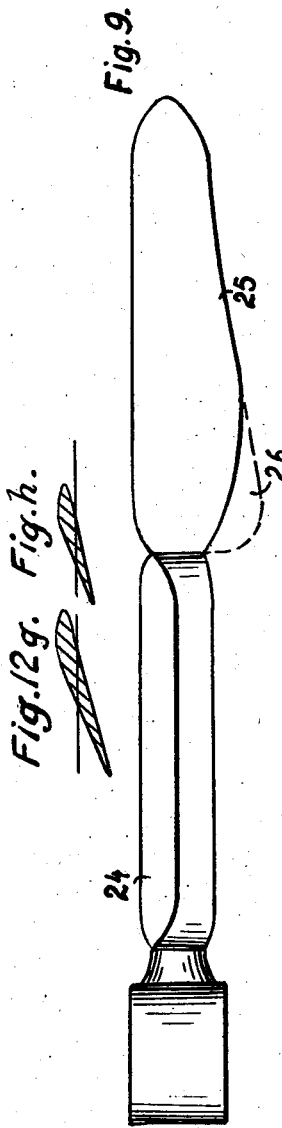
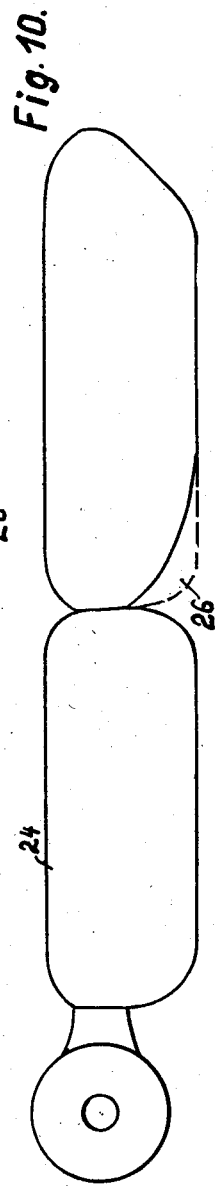

Patented June 20, 1939

2,162,794

UNITED STATES PATENT OFFICE 2,162,794

ROTARY WING AIRCRAFT

Oscar von Asboth, London, England

Application September 30, 1936, Serial No. 103,248
In Germany April 29, 1936

15 Claims. (Cl. 244—18)

The present invention relates to arrangements of rotary wings, to be used for rotary wing aircraft.

In rotary wing aircraft, particularly as regards rotary wings, the following two important problems must be solved. The first concerns the construction of the rotary wings with reference to the greatly varying stresses at different speeds of rotation during translation, i. e., in a lateral wind.

The second problem concerns the design of the rotary wings with reference to the corresponding lifting power, both in the case where the rotary wings are engine-driven and in the case where the rotary wings are driven by the relative wind.

The first mentioned problem relates to the following:

The advancing wings, in forward flight, are subject to considerably higher bending stresses, owing to the increase in their lift, than the retreating wings. As the wings in practice, make several revolutions per second, these frequently recurring variations in stress per second result in strong tendencies to vibration. The hinging of the wings to their axis does not appear to be the right solution as it has shown great practical disadvantages.

In order that the invention may be clearly understood, the same will be described with reference to the accompanying drawings in which:

Fig. 1 is a diagrammatic view in perspective showing two rotary wing systems rotatable about a common axis.

Fig. 2 is a perspective view partly in section showing the mounting of a rotary wing system on its driving shaft.

Fig. 3 is a plan of part of the construction illustrated in Fig. 2.

Figs. 6, 7 and 8 are diagrammatic views illustrating various arrangements of the wing blades.

Fig. 9 is a rear view of a wing blade.

Fig. 10 is a plan of the wing blade shown in Fig. 9.

Fig. 11 is a plan of a modified form of wing blade.

Figs. 12 to 12h show a series of sections of the wing blade shown in Fig. 11.

Fig. 13 shows in perspective a detail of the mechanism for adjusting a wing blade.

Fig. 14 is a perspective view illustrating automatic means for adjusting the wing blades, and Fig. 15 is a diagram illustrating wind-actuated means for adjusting the wing blades.

Figure 4:
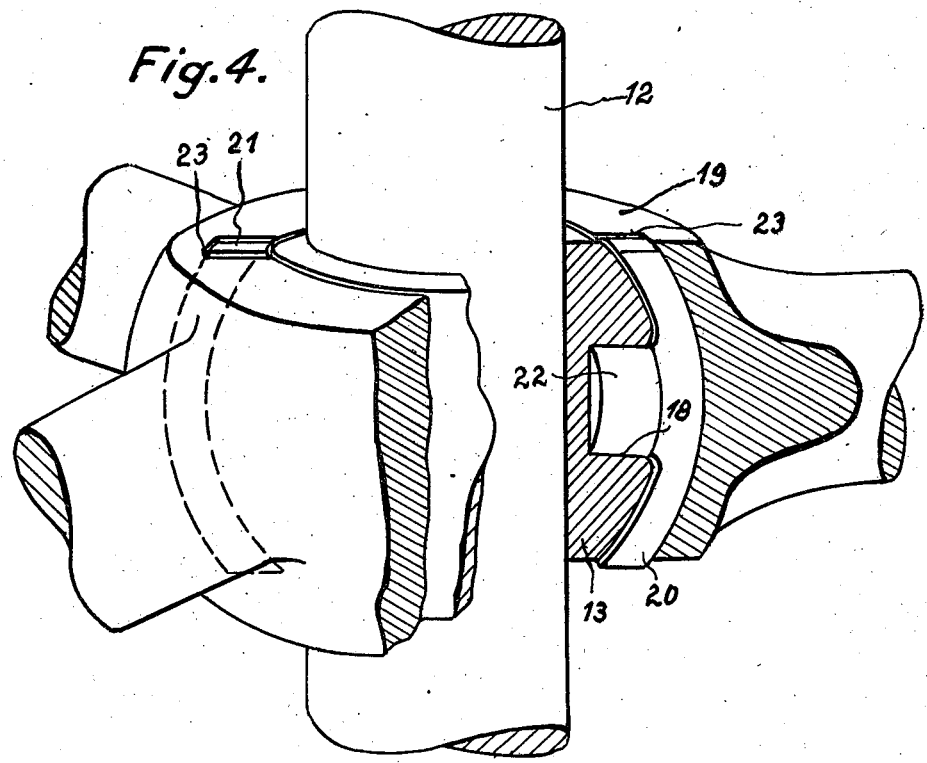
Figs. 4 and 5 show details of a modified construction.

According to the present invention (Fig. 1), the rotary wings 1—6 are rigidly assembled with the hub 7 and the whole system as a unit swivels freely on the rotating shaft 8. In translation, that is in a lateral wind (in forward flight) the plane of rotation will generate more lift on one side of the direction of flight than on the opposite side. Consequently, the entire rigid wing system is inclined sideways about the longitudinal axis of the aircraft, so that the originally horizontal plane of rotation 9 is inclined and the wings rotate in the plane 10. The amount of inclination depends upon the particular lift and the centrifugal force of the wings. Consequently the plane of rotation will be horizontal (plane 9,) when the aircraft is stationary in the air (i. e., without lateral wind). When the aircraft starts flying forwards the plane of rotation of the rotary wing system inclines itself in lateral direction, according to the difference in lift between the right and the left side of the wing system, relative to the longitudinal axis of the aircraft. With this arrangement, an oscillatory movement of the individual wings is impossible, but also unnecessary, within the different periods of revolution, and the wings cannot swing vertically out of their plane of rotation, as the entire plane of rotation is inclined to the longitudinal axis of the aircraft and the rotation takes place in this inclined position.

If two coaxial rotary wing systems, rotating in opposite directions, are arranged one below the other, then the planes of rotation 10 and 11 respectively of the two wing systems are inclined in opposite directions, in such a manner that the planes of rotation of the rotary wings appear like mirror images at every phase of their rotation.

With a construction of the rotary wings adapted to be inclined and comprising only one rotor, it is impossible to eliminate the difference in lift on auto-rotation during translation, between the advancing and retreating wings. In order to reduce this difference in lift to zero, the arrangement of two or more rotor systems which may be inclined relative to one another in opposite directions is necessary.

The rotation of the rotary wings during translation is thus effected in these inclined planes of rotation of the rotary wings, without the rotary wings executing any oscillatory tilting movement.

Other arrangements of the rotary wings may be devised in which the wings are inclined in opposite directions; for example the two wing systems could be arranged non-axially.

This construction of the whole rotary wing system, whereby pivoting is effected through the pivotal arrangement of the wing hub on the rotating shaft, has the additional advantage that gusts of wind incline the whole rotary wing system without transmitting this inclining movement to the fuselage of the aircraft. In still air, the gyroscopic action of the rotary wings ensures that they return and remain in the normal position.

Figs. 2, 3 and 4 show different practical embodiments of the invention, which enable the plane of rotation to be inclined from its horizontal position in any direction by the special construction of the hub.

Referring to Figs. 2 and 3, the rotating shaft 12 carries a spherical portion 13 where the hub is to be mounted. On this spherical part of the shaft, a spherical shell 14 is mounted, which in its turn serves as a bearing for the hub 15, the latter having a spherical inner surface to fit the spherical shell 14.

Figure 5:
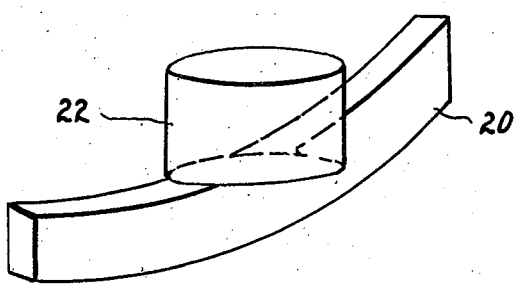

A spline 16 connects the spherical part 13 of the shaft to the spherical shell 14, and the shell 14 is splined to the hub 15 by another spline 17. These splines are arranged in planes situated at right-angles and intersect in the axis of rotation. This arrangement enables the hub 15 to swivel in any direction. Another embodiment is shown in Fig. 4, wherein the spherical part 13 of the shaft contains two apertures or bores 18, the axes of which are aligned in the spherical part 13 of the shaft. The axis of the bores is preferably horizontal. On the spherical part 13 of the shaft is mounted the hub 19, which has a spherical inner surface. In this hub 19 two splines 20, 21 are provided, the inner surfaces of which are spherically shaped to fit the spherical part 13 of the shaft. The splines each have a pin 22 to fit the bores 18. An enlarged view of a combined pin and spline is shown in Fig. 5. The spline slots or splines are situated in a plane intersecting the axis of rotation. As the hub 19 can rotate about the pins 22 and slide to and fro in the direction of the splines 20, 21, the rotary wing system can swivel in any direction.

The inclination of the plane of rotation can be limited, for example, by providing stops 27 (Fig. 2) which may be mounted on the rotating shaft 12.

In the case of a coaxial tandem arrangement with rotary wings situated one below the other, the wings may be arranged on the hub, according to the above described system, either in V-form (Fig. 6) in a straight line (Fig. 7) or in the form of an inverted V (Fig. 8).

The above mentioned second important problem in connection with rotary wings is to generate a high degree of lift, both when the wings are engine-driven and when they are driven by the relative wind. High-lift in the stationary condition ("figure of merit"), as is well-known, can only be obtained by wings where the angles of incidence of the wings at different radii decrease towards the wing tips. It follows that the angles of incidence of such rotative wings increase towards the hub (rotating shaft).

For the production of auto-rotation by the lateral wind on the contrary, it is a main condition that the angles of incidence of the wings must be kept very small.

If to comply with these last mentioned conditions, the inner parts of the wings, where the angles of incidence are too large for auto-rotation, are so constructed (Figs. 9 and 10, rear view and plan view) that the inner parts 24 are adjustable independently of the outer parts 25 of the wings, which generate the lift and can be adjusted according to the particular angle of incidence of the relative wind or according to the particular conditions of flight. However the portion 26 of the outer part of the wings which lies towards the hub will still have too large an angle of incidence for auto-rotation, and to prevent this large angle of incidence of the above mentioned wing parts 26 from impeding auto-rotation, the parts 26 may either be cut away or provided with decreasing angles of incidence towards the hub. In this case, the angle of incidence of the outer, lift generating parts 25 of the wings, is zero or very small at a point where it meets the adjustable inner part 24 which causes auto-rotation, and increases towards the wing-tip up to a certain radius, from which point the angles of incidence again decrease towards the wing-tip. This arrangement does not adversely affect the generation of a high-lift, as the centre of lift in such a wing lies at a point about eight tenths along its length from the hub, i. e., the inner part of the wing up to 0.8 of its length generates as much lift as the outer part of 0.2 of the wing. This change in the above described small wing part 26 does not exert a detrimental influence on the production of lift.

For the generation of a high-lift on stationary flight of the rotary wing aircraft, such a large pitch is necessary that, notwithstanding the above described measures the average angle of incidence of the outer wing part 25 is too large to obtain a good auto-rotation effect. Consequently the adjustment of the outer wing part 25 with the above described form of construction is suggested, when the rotary wing aircraft changes to forward flight.

The functioning of this embodiment is as follows. In stationary flight, the inner parts 24 of the wings are kept at zero or small (positive or negative) angles of incidence and the outer wing parts 25 at their position of maximum angle of incidence. On changing to forward flight (gliding flight) the angles, both wing parts 24, 25 are adjusted in a negative sense. The size of the angles of incidence of both wing parts 24, 25 in a negative sense is a function of the flying speed and the gliding angle that is of the conditions of flight.

An advantageous arrangement is shown in Fig. 11 in which the two parts of the wing are combined in one unit. With this design, the angles of incidence of the wing-sections in the stationary condition at the different radii are as follows.

The angles of incidence of the inner wing parts, which cause auto-rotation (Figs. 11 and 12) are zero or, preferably small negative angles (radii $a$, $b$).

The radii $c$—$h$, which lie in the transitional part, i. e., between the inner part causing auto-rotation and the outer part 25 generating lift, increase towards the wing tip, and the radii of the outer part which exclusively generates lift decrease towards the wing tip ($j$, $i$).

In forward flight (gliding flight) the whole angle of incidence of the entire wing is adjusted in a negative direction, so that, depending on the flying speed or on the gliding angle, the inner part of the wing (radii $a$, $b$) will show steadily increasing negative angles of incidence and the outer part steadily decreasing positive angles of incidence, the difference between them being, preferably, only a few degrees. The middle part of the rotary wing shows angles of incidence which steadily vary at the transition point (c—h) from the negative angle of incidence of the outer end of the inner wing part up to a positive angle of incidence of the inner end of the outer wing part.

In this manner for auto-rotation, rotary wings are produced the outer parts of which will not have much larger angles of incidence than the known rotary wings which show good auto-rotation effects, whilst their inner parts are able to exert much better effects as regards auto-rotation than the known rotary wing systems. In other words, by means of the above design and adjustment of the rotary wing it is possible to obtain a high degree of lift in the stationary condition, combined with good auto-rotative qualities by the relative wind.

The adjustment of the wing parts may be effected in known manner by means of Bowden cables 28, 29 controlled by operating lever arms 30, 31 (Figure 2) which are preferably self-locking. The self-locking device may be mounted directly on the rotary wing, or on its spar (Fig. 13), by using, for example, a Bowden-cable 32, worm 33 and worm wheel 34. A pull on the Bowden cable moves a lever arm 35, thereby rotating the worm 33 mounted on its spindle. This moves the wheel 34, which is connected to the wing part 36. The movement of lever arm 35 in both directions may be accomplished in known manner by a second Bowden-cable which effects the movement of the mechanism in the reverse direction or, for example, by the use of spiral springs 37 which are constantly compressed by the Bowden-cable 32.

An advantageous construction of the device for adjustment of the angles of incidence of the rotary wings or their parts in a negative or positive direction, is a construction which, on attaining the extreme position (angle of incidence) automatically eliminates the further adjustment of the wings in the same direction and only permits adjustment in the opposite direction.

The adjustment of the rotary wing part or parts may also be accomplished through a governor. The governor may be influenced by the engine torque or by the air forces.

Figure 14 illustrates a form of construction wherein the governor is actuated by the engine torque. A casing 38 is mounted on the shaft driven by the engine. The casing 38 carries lugs or projections 40. In this casing a shaft 42 is mounted on bearings 41, the end of which shaft extends into the casing and is provided with buffer projections 43. Spiral springs 44 are mounted between the lugs and the buffers 43. The other end of the shaft 42 extending out of the casing 38 has the form of a worm gear 45. Between the worm gear 45 and the portion 46 of the casing there is arranged a ring 47 having its inner surface threaded to conform to the worm gear 45 and its outer surface provided with splines 48, which fit into slots in the portion 46. The engine-torque compresses the spiral springs 44 between lugs 40 and buffers 43. When this pressure decreases, the spiral springs 44 extend and cause the shaft 42 and worm 45 to rotate relative to the casing 38. As ring 47 is prevented, through the splines 48, from following this rotative movement, the ring 47 will move axially when the worm 45 rotates and thereby actuate a coupled lever arm 49. By connecting the other end 50 of lever 49 to the wing or wing-parts, the variation of the torque may thus be employed to adjust the angles of incidence of the rotary wings or wing-parts.

It is also possible to use a governor, the function of which is actuated by air forces or the direction of wind. In Figure 15 a construction is shown, by way of example, utilizing a wind-vane 52 (wind direction indicator) as regulator. This adjusts itself to conform to the particular wind direction or pressure 51. The lever arms 54 mounted on the shaft 53 of the vane are connected, for example, to the wing adjusting mechanism, either directly or through, for example, servo motors 55. In this way, the adjustment of the rotary wings may be made dependent upon the particular angle of incidence of the air-stream gliding angle.

It is preferable that the axis of rotation of the adjustment of the angles of incidence of each wing blade should lie in front of the centre line of lift of the profiles of the rotary wing. In the case of failure of the adjusting device, the resultant lifting forces produce a torque about the axis of rotation of the wing blade in the sense of reducing the angle of incidence, so that self-rotation is ensured, the reduction of the angle of incidence being limited by a correspondingly arranged stop.

If two coaxial rotary wing systems are arranged one below the other and rotate in opposite directions, the upper wing, in gliding flight receives from the lower wing a disturbed air stream and therefore it is possible that the upper wing may receive an additional torque if the two wing systems are positively driven. To obviate the disadvantage which arises through this additional torque, it is advantageous to choose different dimensions for the two wing systems. This can be effected, for example, by giving to the inner part, which produces the auto-rotation, or only to the outer part, or even to both parts of one rotary wing system dimensions which differ from those of the other rotary wing system.

A further possibility is provided in the case where both wing systems have the same or approximately the same dimensions and are only adjusted independently of one another during the change into lateral or gliding flight.

I claim:

1. A rotary wing aircraft comprising a body structure, wing blades rotatably mounted on said body structure, the said wing blades being shaped to form an inner wing part the angles of incidence of which are in the range of small positive, zero and small negative values, and an outer wing part of which the angles of incidence correspond to a more positive pitch than those of the inner wing part, the outer wing part being so formed that the angles of incidence increase from the end adjoining the inner wing part and again decrease in the outer region of the outer wing part.

2. A rotary wing aircraft comprising a body structure, wing blades rotatably mounted on said body structure, the said wing blades being shaped to form an inner wing part the angles of incidence of which are in the range of small positive, zero and small negative values and an outer wing part of which the angles of incidence correspond to a more positive pitch than those of the inner wing part, the outer wing part being so formed that the angles of incidence increase from the end adjoining the inner wing part and again decrease in the outer region of the outer wing part, the width of the outer wing part being narrowed towards the inner end of said part.

3. A rotary wing aircraft comprising a body structure, wing blades rotatably mounted on said body structure, the said wing blades being shaped to form an inner wing part the angles of incidence of which are in the range of small positive, zero and small negative values, and an outer wing part of which the angles of incidence correspond to a more positive pitch than those of the inner wing part, the outer wing part being so formed that the angles of incidence increase from the end adjoining the inner wing part and again decrease in the outer region of the outer wing part, and means for adjusting the angles of incidence of said wing blades.

4. A rotary wing aircraft comprising a body structure, wing blades rotatably mounted on said body structure, the said wing blades being shaped to form an inner wing part the angles of incidence of which are in the range of small positive, zero and small negative values, and an outer wing part of which the angles of incidence correspond to a more positive pitch than those of the inner wing part, the outer wing part being so formed that the angles of incidence increase from the end adjoining the inner wing part and again decrease in the outer region of the outer wing part, and means for adjusting the angles of incidence of at least one of said wing parts.

5. A rotary wing aircraft comprising a body structure, wing blades rotatably mounted on said body structure, the said wing blades being shaped to form an inner wing part the angles of incidence of which are in the range of small positive, zero and small negative values and an outer wing part of which the angles of incidence correspond to a more positive pitch than those of the inner wing part, the outer wing part being so formed that the angles of incidence increase from the end adjoining the inner wing part and again decrease in the outer region of the outer wing part, a shaft arranged longitudinally of at least one of said wing parts, and means for adjusting said wing part about said shaft.

6. A rotary wing aircraft comprising a body structure, wing blades rotatably mounted on said body structure, the said wing blades being shaped to form an inner wing part the angles of incidence of which are in the range of small positive, zero and small negative values and an outer wing part of which the angles of incidence correspond to a more positive pitch than those of the inner wing part, the outer wing part being so formed that the angles of incidence increase from the end adjoining the inner wing part and again decrease in the outer region of the outer wing part, a shaft arranged longitudinally of at least one of said wing parts, means for adjusting said wing part about said shaft, and mechanism controlled by the relative motion of the air and controlling the setting of said adjusting means.

7. A rotary wing aircraft comprising a body structure, an engine, wing blades rotatably mounted on said body structure, the said wing blades being shaped to form an inner wing part the angles of incidence of which are in the range of small positive, zero and small negative values and an outer wing part of which the angles of incidence correspond to a more positive pitch than those of the inner wing part, the outer wing part being so formed that the angles of incidence increase from the end adjoining the inner wing part and again decrease in the outer region of the outer wing part, a shaft arranged longitudinally of at least one of said wing parts, means for adjusting said wing part about said shaft, and mechanism controlled by the torque transmitted by the engine and controlling the setting of said adjusting means.

8. A rotary wing aircraft comprising a body structure, wing blades rotatably mounted on said body structure, the said wing blades comprising two separate wing parts, an inner wing part the angles of incidence of which are in the range of small positive, zero and small negative values, and an outer wing part of which the angles of incidence correspond to a more positive pitch than those of the inner wing part, the angles of incidence of the outer wing part increasing from the end adjacent the inner wing part and again decreasing towards the outer end of the outer wing part, and means for adjusting the pitch setting of at least one of the wing parts.

9. A rotary wing aircraft comprising a body structure, wing blades rotatably mounted on said body structure, the said wing blades comprising two separate wing parts, an inner wing part the angles of incidence of which are in the range of small positive, zero and small negative values, and an outer wing part of which the angles of incidence correspond to a more positive pitch than those of the inner wing part, the angles of incidence of the outer wing part increasing from the end adjacent the inner wing part and again decreasing towards the outer end of the outer wing part, and means for separately adjusting the pitch settings of said wing parts.

10. A rotary wing aircraft comprising a body structure, wing blades rotatably mounted on said body structure, the said wing blades comprising two separate wing parts, an inner wing part the angles of incidence of which are in the range of small positive, zero and small negative values, and an outer wing part of which the angles of incidence correspond to a more positive pitch than those of the inner wing part, the angles of incidence of the outer wing part increasing from the end adjacent the inner wing part and again decreasing towards the outer end of the outer wing part, a shaft arranged longitudinally of each of said wing parts, and means for separately adjusting said wing parts about said shaft.

11. A rotary wing aircraft comprising a body structure, two shafts rotatably mounted in said structure, means for rotating said shafts in opposite directions, two hubs each articulately connected to one of said shafts so as to be free to swivel in all directions, and two sets of wing blades, each set being associated with one of said hubs, the individual wing blades of each set being rigidly connected to the associated hub to form with said hub a rigid rotor system, the angles of incidence of one set of wing blades being opposite to those of the other set.

12. A rotary wing aircraft comprising a body structure, two shafts rotatably mounted in said structure, means for rotating said shafts in opposite directions, two hubs each articulately connected to one of said shafts so as to be free to swivel in all directions, and a set of wing blades rigidly connected to each of said hubs, the angles of incidence of one set of wing blades being opposite to those of the other set, each wing blade being shaped to form an inner wing part the angles of incidence of which are in the range of small positive, zero and small negative values and an outer wing part of which the angles of incidence correspond to a more positive pitch than those of the inner wing part, the outer wing part being so formed that the angles of incidence increase from the end adjoining the inner wing part and again decrease in the outer region of the outer wing part.

13. A rotary wing aircraft comprising a body structure, two shafts rotatably mounted in said structure, means for rotating said shafts in opposite directions, two hubs each articulately connected to one of said shafts so as to be free to swivel in all directions, and a set of wing blades rigidly connected to each of said hubs, the angles of incidence of one set of wing blades being opposite to those of the other set, each of said wing blades comprising two separate wing parts, an inner wing part the angles of incidence of which are in the range of small positive, zero and small negative values, and an outer wing part of which the angles of incidence correspond to a more positive pitch than those of the inner wing part, the angles of incidence of the outer wing part increasing from the end adjacent the inner wing part and again decreasing towards the outer end of the outer wing part, and means for adjusting the pitch setting of at least one of the wing parts of each blade.

14. In a rotary wing aircraft, rotary wing blades, an engine, a shaft driven by the engine, a casing mounted on and coaxial with said shaft, a driving connection between said casing and the rotary wing arrangement, a resilient connection between said shaft and said casing, a thread upon said shaft, a nut screwed on said thread, means connecting said nut and said casing whereby the nut may move longitudinally with reference to the casing but may not rotate with reference thereto, and means for adjusting the pitch setting of said blades in accordance with the longitudinal movement of said nut.

15. In a rotary wing aircraft, rotary wing blades, each blade comprising at least two wing parts, an engine, a shaft driven by the engine, a casing mounted on and coaxial with said shaft, a driving connection between said casing and the rotary wing arrangement, a resilient connection between said shaft and said casing, a thread upon said shaft, a nut screwed on said thread, means connecting said nut and said casing whereby the nut may move longitudinally with reference to the casing but may not rotate with reference thereto, and means for adjusting the pitch setting of at least one of said wing parts in accordance with the longitudinal movement of said nut.

OSCAR VON ASBOTH.